United States Patent [19]
O'Rourke

[11] Patent Number: 5,902,148
[45] Date of Patent: May 11, 1999

[54] MULTIPLE RECEPTACLE EXTENSION CORD

[76] Inventor: Kevin P. O'Rourke, 898 Sixth St., S W., Wells, Minn. 56097

[21] Appl. No.: 09/114,576

[22] Filed: Jul. 13, 1998

Related U.S. Application Data

[63] Continuation of application No. 08/816,169, Mar. 12, 1997, abandoned.

[51] Int. Cl.⁶ .................................................. H01R 11/00
[52] U.S. Cl. ........................................... 439/505; 439/956
[58] Field of Search ..................... 439/502, 505, 439/135, 148, 215, 933, 936

[56] References Cited

U.S. PATENT DOCUMENTS

| | | | |
|---|---|---|---|
| 1,512,888 | 10/1924 | Haft ........................................ | 174/160 |
| 1,758,982 | 5/1930 | Seghers ................................... | 315/192 |
| 1,818,884 | 8/1931 | Eckstein .................................. | 439/391 |
| 1,974,472 | 9/1934 | Seghers ................................... | 307/157 |
| 3,890,030 | 6/1975 | McDaniel ................................ | 439/490 |
| 4,037,901 | 7/1977 | Kaszuba .................................. | 439/139 |
| 4,083,621 | 4/1978 | Davidson et al. ....................... | 439/501 |
| 4,520,239 | 5/1985 | Schwartz ................................. | 191/12.4 |
| 4,717,350 | 1/1988 | Lax .......................................... | 439/92 |
| 4,781,609 | 11/1988 | Wilson et al. ........................... | 439/215 |
| 4,861,288 | 8/1989 | Friedman ................................ | 439/933 |
| 5,071,367 | 12/1991 | Luu ......................................... | 439/501 |
| 5,213,519 | 5/1993 | Dorfman ................................. | 439/505 |
| 5,234,360 | 8/1993 | Kramer, Jr. ............................. | 439/505 |
| 5,236,374 | 8/1993 | Leonard et al. ........................ | 439/505 |
| 5,238,416 | 8/1993 | Dickie ..................................... | 439/148 |
| 5,238,424 | 8/1993 | Vindum ................................... | 439/425 |
| 5,308,253 | 5/1994 | Maki ....................................... | 439/148 |
| 5,453,916 | 9/1995 | Tennis et al. ........................... | 439/505 |
| 5,542,852 | 8/1996 | Hsueh ..................................... | 439/135 |

*Primary Examiner*—Neil Abrams
*Assistant Examiner*—Barry M. L. Standig

[57] ABSTRACT

An extension cord having multiple female sockets which are attached to two or more conducting wires. In one embodiment of the invention, the cord has three or more conducting wires with two or more female sockets attached to the conducting wires. Each of the female sockets is attached to two of the conducting wires and each conducting wire is attached to at least one female socket. This may provide an extension cord having two or more electrically isolated circuits. Alternatively, or in addition, the cord may be configured to provide groups of female sockets each with different voltage ratings. In another embodiment of the invention, the cord has multiple socket blocks attached to the cord; each socket block housing one or more of the female sockets. A mooring member is attached to each of the socket blocks so that the cord may be fastened or held by an external object.

22 Claims, 7 Drawing Sheets

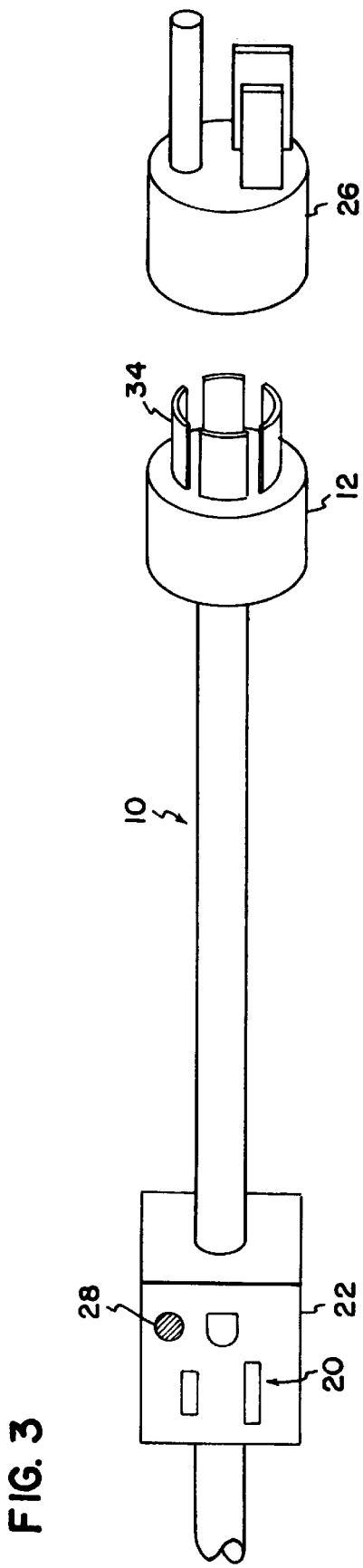

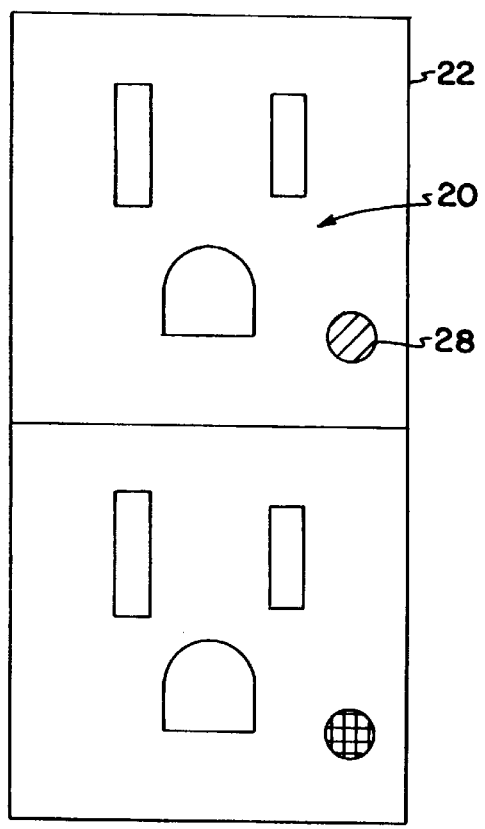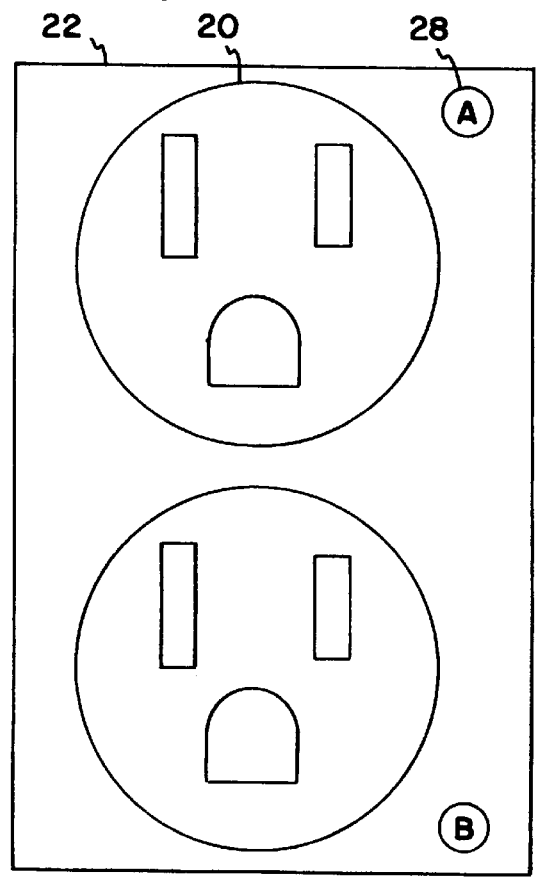

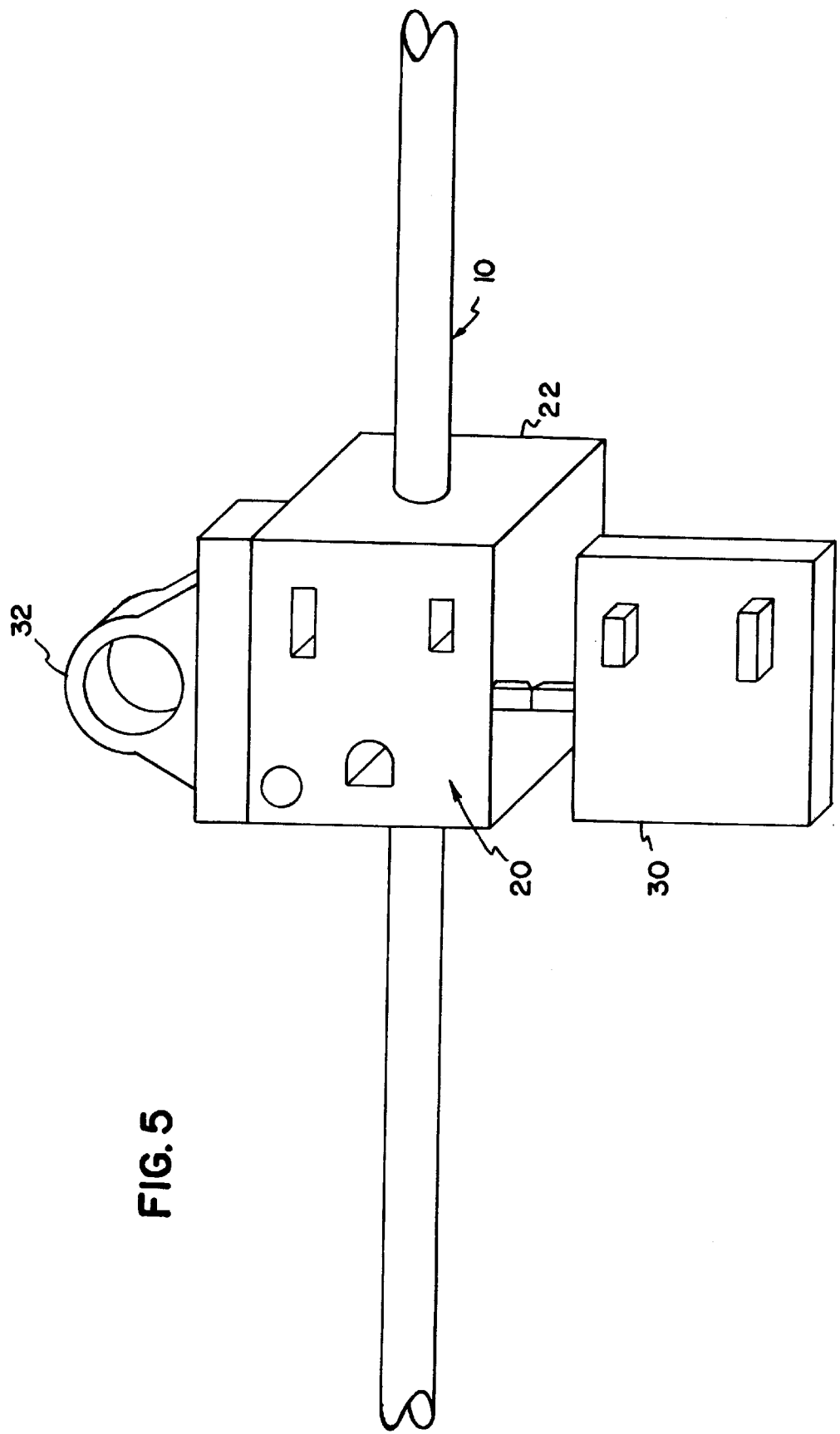

MULTIPLE RECEPTACLE EXTENSION CORD

This application is a continuation of application Ser. No. 08/816,169, filed Mar. 12, 1997 now abandoned, which application(s) are incorporated herein by reference.

TECHNICAL FIELD

The invention relates to extension cords, and more specifically, to extension cords having sockets intermittently spaced along the length of the cord.

BACKGROUND

Extension cords are used extensively in many applications because they provide a convenient way to deliver electrical power from an electrical outlet to equipment that is far away from the outlet. However, there are significant safety concerns that are associated with the use of extension cords. Several of these concerns are most readily apparent at construction sites, although other extension cord applications will also benefit from solutions to these problems.

One particularly important safety issue often associated with construction sites is the use of many extension cords because of the large number of tools that need electricity to operate. Typically these devices may not be plugged into the same cord because they would, in combination, require too much current to be safely provided through a single cord. This safety concern is especially true at construction sites where at least some of the equipment draws a large amount of power. Extension cords can provide only a limited amount of current before tripping the fuses associated with the cord or the outlet into which the cord has been plugged. These fuses are designed to prevent fires and electrical damage due to unsafe (i.e., high) currents flowing through the cord or outlet.

Extension cords are also hazardous because they are often laid on the floor where individuals may trip over them, injuring the individual or pulling the cord out of the socket in which it is plugged. This hazard is increased as more cords are used with the additional danger that the cords may become tangled. Thus, there is a need for the development of an extension cord into which more equipment can be plugged to reduce the number of extension cords needed. Such an extension cord increase the level of safety for individuals working around and with the cords.

Furthermore, additional extension cords may be necessary because different pieces of equipment require different amounts of voltage to operate. For example, most electrically operated devices require a 120 V source. However, some devices use a large amount of power and thus require 208 V or 240 V supplies. There is a need for the development of a single extension cord that provides multiple values of voltage.

Another concern associated with current extension cords is that there is often no safe and effective method for fastening the cord to an object, such as a wall, or, alternatively, for holding the cord off the ground. It would be convenient and enhance safety at construction sites, as well as other places, for extension cords to be fastened to an object so that the cords are not moved or pulled out of the outlet. In the household context, it is often desirable to be able to fasten an extension cord to a wall or ceiling in a home or workshop as a semi-permanent electrical power connection.

Furthermore, it is often important to hold the cord off the ground so that the cord is not lying in mud or water, which is hazardous to both the devices attached to the cord as well as to those working in the area around the cord. Moreover, an individual may need to use an extension cord outside for items such as outdoor holiday lights where it is desirable to have the extension cord off the ground and away from mud, water, snow, and ice. Thus, there is a need for an extension cord that can be conveniently fastened to or held by external devices or objects.

SUMMARY

The present invention includes an extension cord which has a male plug and at least three conducting wires coupled to the plug. At least two female sockets are disposed at intervals along the lengths of the conducting wires. Each female socket is electrically coupled to two of the conducting wires. Each conducting wire is electrically coupled to at least one of the of female sockets.

The present invention also includes an extension cord which has a male plug and at least two conducting wires coupled to the plug. One or more socket blocks are attached to the conducting wires at intervals along the cord. Each socket block has one or more female sockets coupled to two of the conducting wires. The female sockets are configured to receive male plugs of electrically operated devices. Each socket block also has a mooring member coupled to the socket block. The mooring member is configured and arranged to permit attachment of the socket block to an external object.

BRIEF DESCRIPTION OF THE DRAWINGS

FIG. 3 is a perspective view of an alternative embodiment of the extension cord shown in FIG. 1 having an optional adapter for the male plug of the extension cord;

FIGS. 4(a) and 4(b) are front views of alternative socket block configurations having circuit identifying marks for use with the extension cord shown in FIG. 1;

FIG. 5 is a perspective view of a female socket and socket block with an optional cap and an optional mooring member.

DETAILED DESCRIPTION

Figure 1:
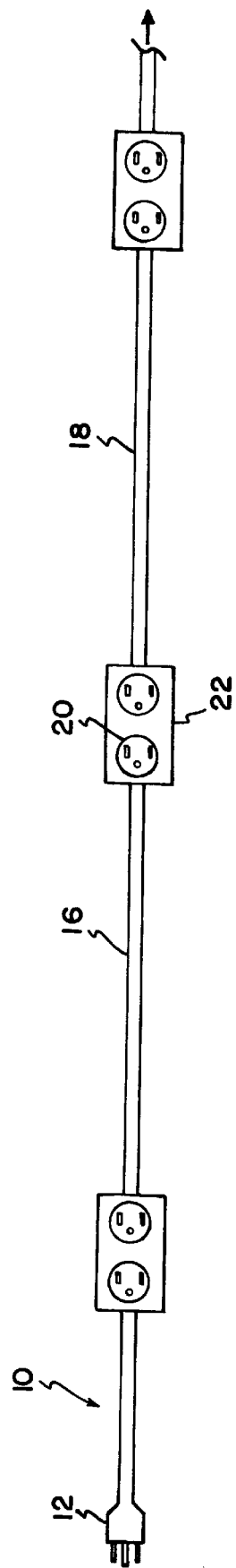
FIG. 1 is a front view of a first embodiment of the extension cord of the present invention showing a male plug, female sockets, and socket blocks of the cord.

A preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

In general, the present invention relates to extension cords having intermittently spaced sockets along the length of the cord. One possible embodiment of the invention includes sockets which form two or more groups, each group attached to different conducting wires of the cord to provide two or more electrical circuits. These electrical circuits may be electrically isolated. Electrical equipment plugged into this cord can then be balanced between the circuits to prevent overload. In another embodiment, each group of sockets may be configured to provide a different value of voltage.

Yet another embodiment of the invention includes mooring members attached to female sockets or to socket blocks of an extension cord to facilitate attachment of the cord to an external object to, for example, keep the cord off the ground.

Referring to the drawings, FIG. 1 shows an extension cord 10 with a male plug 12 attached to the end of the cord. The cord 10 has two or more conducting wires and an optional ground wire, as discussed hereinbelow, coupled to the male plug 12. The conducting wires and optional ground wire are typically bound together into a single cord 16 that is covered by an insulated sheathing 18. The gauge of the conducting wires is chosen based on the length and expected use of the extension cord. Thicker wires are appropriate for longer cords and for cords used in heavy-duty applications that have large power requirements. Finer gauged wires are used for household extension cords.

One or more socket blocks 22 are disposed at intervals along the length of the extension cord 10. These intervals are typically regular, but may also be irregular. Each socket block 22 houses two female sockets 20. In other possible embodiments, however, the socket blocks 22 can house one female socket 20 or three or more female sockets 20. Yet other possible embodiments include a mixture of sockets blocks containing different numbers of female sockets, such as one female socket in some of the socket blocks and two female sockets in other socket blocks.

Typically, the socket blocks, insulated sheathing, and the housing of the male plug are constructed from plastics or polymers. In one possible embodiment, the male plug 12, socket blocks 22, and insulated sheathing 18 are molded together to form one continuous piece. This continuously molded embodiment of the extension cord is desirable because of the elimination of joints between the sheathing and the plug or socket blocks. Such joints often weaken the cord integrity and may provide an avenue for the entry of moisture into the interior of the cord which may short or damage the conducting wires.

Figure 2A:
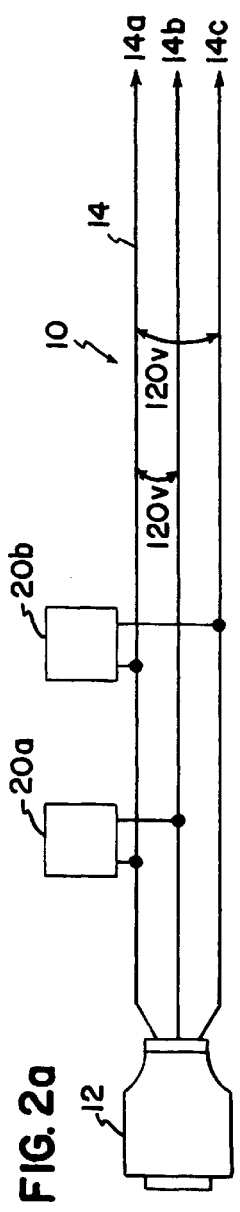
FIGS. 2(a)–2(f) show schematic views of various alternative embodiments of the extension cord shown in FIG. 1.

Examples of coupling configurations between the female sockets 20 and the conducting wires 14a–14g are provided in FIGS. 2(a)–2(f). One embodiment of the extension cord of the present invention has three conducting wires and is illustrated in FIG. 2(a). This extension cord 10 can be used, for example, with a single phase, three wire 120/240 V service. This type of service is often available in the United States as the primary connection from electrical transmission lines to residential and commercial properties. In this configuration, one of the conducting wires 14a is a neutral wire that is typically held at or near ground. The other two conducting or circuit wires 14b, 14c are held at about 120 V above ground. These latter two wires are typically called "hot" or active wires because they provide a non-zero voltage drop across any grounded object. Each circuit wire is used to establish a separate circuit to which female sockets are attached.

As shown in FIG. 2(a), female sockets 20a and 20b are coupled to different active wires to create a cord 10 with two electrically isolated circuits. One or more female sockets 20a of extension cord 10 are coupled to the neutral wire 14a and one of the 120 V active wires 14b. One or more female sockets 20b are coupled to the neutral wire 14a and the other 120 V active wire 14c. Each of the female sockets is capable of providing 120 volts to electrically operated devices plugged into that socket.

Figure 2B:
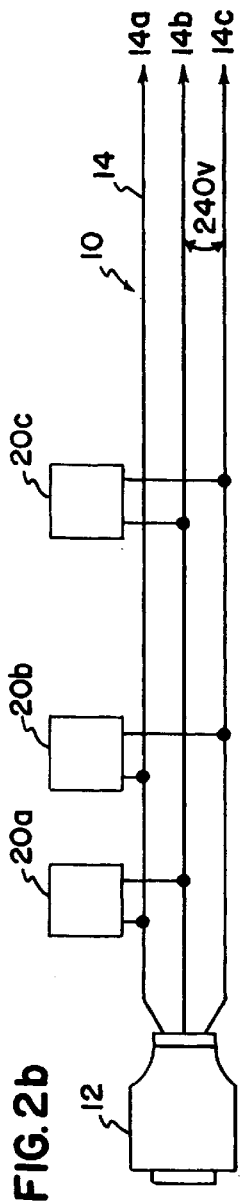

FIG. 2(b) is an alternate embodiment of the extension cord 10 of the present invention having one or more female sockets 20c capable of providing 240 volts, in addition to the female sockets 20a, 20b which provide 120volts. The 240 volt female socket 20c is coupled to both of the 120 V active wires 14b, 14c (and not to the neutral wire 14a) and provides 240 volts because the 120 V circuit wires are 180° out of phase. Many heavy-duty tools and appliances, such as clothes dryers, require 240 volts, while the majority of electrically operated devices in the United States operate with 120 volts. With this embodiment of cord 10 only one cord is needed to operate pieces of equipment that have different voltage ratings.

Figure 2C:
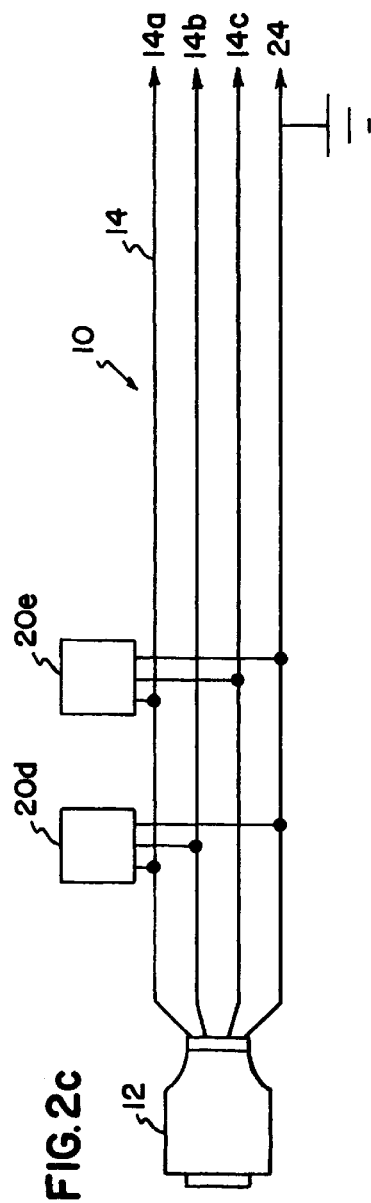

A third embodiment of the present invention is depicted in FIG. 2(c) and shows one or more female sockets 20d coupled to the neutral wire 14a, one of the 120 V active wires 14b, and a grounding wire 24. In addition, one or more female sockets 20e are connected to the neutral wire 14a, the other 120 V active wire, 14c, and the grounding wire 24. Typically, grounding wire 24 is locally grounded as opposed to being grounded at the power source as is often the case for neutral wire 14a. This cord provides female sockets 20d and 20e, which are connected to different circuits and are also locally grounded. Electrical equipment plugged into one of the female sockets will be electrically isolated from equipment plugged into the other socket.

Figure 2D:
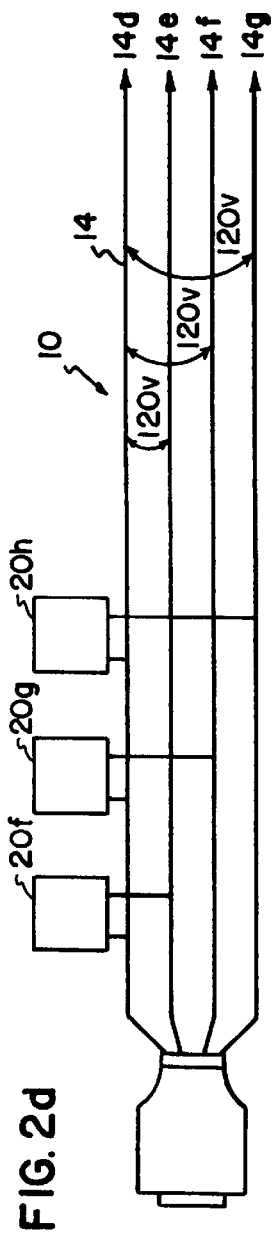
Figure 2E:
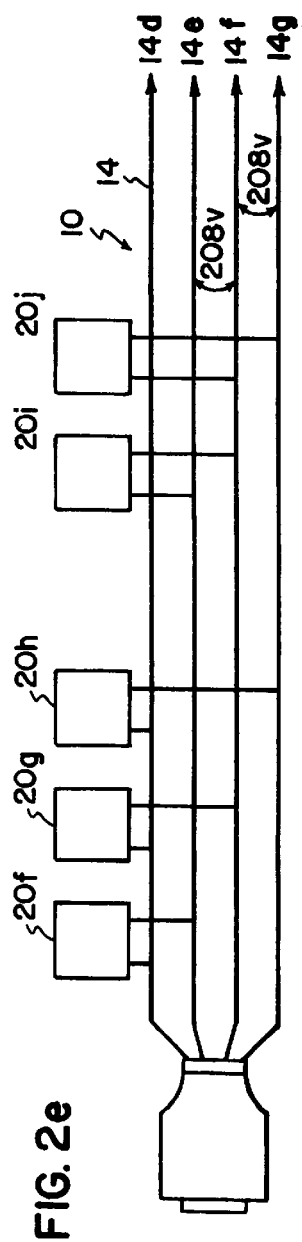
Figure 2F:
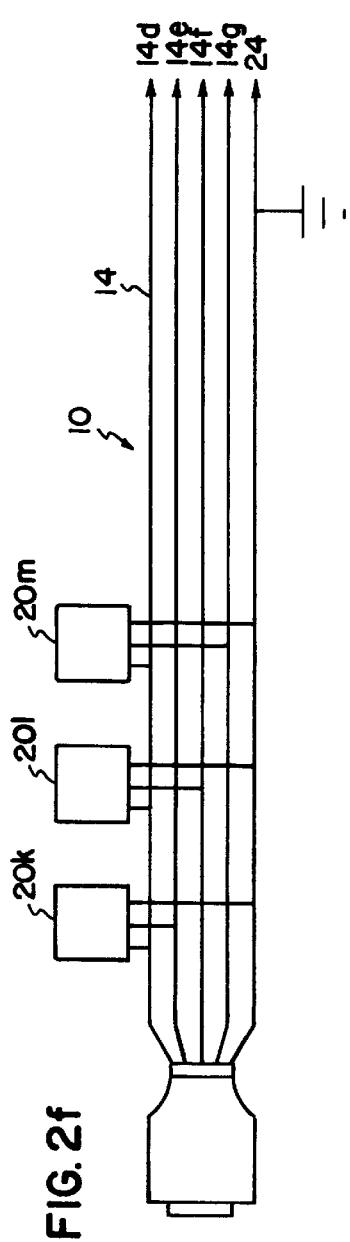

Extension cords 10 can also be made for use with voltage services other than the typical 120/240 volt service. One example is a 120/208 volt service which is often configured as a three-phase, four-wire system. FIGS. 2(d)–2(f) illustrate alternative embodiments of cords for use with this type of service. FIG. 2(d) shows one embodiment of a cord 10 for use with a four-wire service that has a neutral wire 14d and three 120 V active wires 14e, 14f, 14g. Three different circuits can be made. One or more female sockets 20f are coupled to neutral wire 14d and active wire 14e, one or more female sockets 20g are coupled to neutral wire 14d and active wire 14f, and one or more female sockets 20h are coupled to neutral wire 14d and active wire 14g. The three circuits corresponding to sockets 20f, 20g, and 20f, respectively, are electrically isolated.

Alternatively, additional female sockets 20i and 20j can be coupled between any two of the active wires 14e–14g as illustrated in FIG. 2(e). These sockets will provide 208 volts to any electrically operated devices plugged into the socket.

In yet another embodiment, a grounding wire 24 is added to provide a five-wire configuration as shown in FIG. 2(f). Female sockets 20k, 20l, 20m are then coupled to the neutral wire 14d, one of the active wires 14e–14g, and the grounding wire 24 to provide three separate 120 V grounded circuits.

The alternative embodiments shown in FIGS. 2(a)–(f) are merely illustrative. It will be recognized that the same principles can be used to construct extension cords for any voltage service that has three or more conducting wires. In addition, all of the female sockets represented in each of FIGS. 2(a)–(f) are not necessary for a cord constructed according to the principles of the present invention. For example, an extension cord of the present invention can be constructed similar to the embodiment depicted in FIG. 2(e) by including only female sockets 20f and 20j. Such a cord would have two electrically isolated circuits, one of which would provide 120 V service and the other 208 V service.

The extension cords 10 of the present invention, especially those with electrically isolated circuits, are especially useful when heavy power drawing devices or many electrically operated devices are attached to the extension cord. The power load from these devices can be balanced between the two or more isolated circuits so that a single extension cord can be used where two or more extension cords would otherwise be required. By balancing the power load between the isolated circuits, devices may be plugged into a single extension cord of the invention and draw power which, when plugged into a typical one circuit cord would otherwise result in tripping a fuse attached to the outlet or the cord; damage the cord or the equipment plugged into it; or even causing a fire. Balancing the power load between the multiple circuits of the extension cord of the present invention permits more equipment to be operated safely with a single extension cord.

In one embodiment of the invention, a fuse (not shown) is attached to at least one of the 120 V circuit wires 14b, 14c, 14e–14g of the cord to prevent damaging current from being drawn from the voltage source. However, if the fuse is tripped on one circuit wire it will have no effect on the devices attached to the other circuit wires if they are electrically isolated.

FIG. 3 shows a female socket 20 for use with a standard U.S. 120 V male plug from an electrically operated device. In this embodiment of the invention, the male plug 12 of the extension cord 10 has four prongs 34 and is configured for attachment to a 120/240 V service. One common configuration for a male plug 12 to be used with a 120/240 V service is a twist lock plug where the plug is inserted into an appropriate female outlet, not shown, and then the male plug is twisted to securely fasten the prongs 34 of the plug within the outlet. This type of male plug configuration ensures that the plug does not come out of the outlet by simply pulling on the plug, thereby providing an additional safety feature to users.

An optional adapter 26 may be provided for adapting this embodiment of the extension cord for use with a 120 V source. This adapter 26 has a female portion configured to receive the male plug 12 of the extension cord 10 and a male portion for plugging into a female outlet of a 120 V source. If such an adapter were used, for example, with the extension cord configuration of FIGS. 2(a) or 2(c), the adapter would include an electrical connection between the two 120 V conducting wires 14b and 14c so that they would be attached to the same prong of the adapter. When using this adapter the electrically operated devices plugged into the extension cord will all be part of the same circuit despite using coupling configurations illustrated in FIGS. 2(a) and 2(c) due to the connection of the two circuit wires in the adapter. Furthermore, instead of being a separate attachment, the adapter may alternatively be integrally coupled to the cord.

Other adapters may be provided for conversion between extension cords of the invention and other voltage source configurations. In addition, adapters may be provided that will convert the prong configuration of the male plug of the extension cord to an appropriate configuration for use in another country or region.

FIG. 4(a) shows a socket block 22 with rectangular female sockets 20. FIG. 4(b) shows a socket block 22 with circular female sockets 20. Other socket and socket block configurations are possible.

In one embodiment of the invention, a circuit identifying mark 28 is provided proximate each of the female sockets 20. The circuit identifying mark 28 may be color-coded (see FIG. 4(a)), numbered, lettered (see FIG. 4(b)), stamped, or otherwise configured to indicate the circuit to which the proximate female socket is attached. The circuit identifying mark 28 provides an extension cord user with information about which circuit the device is being plugged into so that the user may balance the power load of the circuit.

FIGS. 4(a) and 4(b) both show socket blocks 22 for use with cords of the present invention in which the two female sockets 20 of the socket block 22 are each attached to different circuits. However, other configurations are also possible including having the female sockets 20 of each socket block 22 attached to the same circuit or alternatively, having more than one female socket in each socket block attached to the same circuit. For example, in one embodiment of the invention, not shown, two out of four female sockets in a socket block are attached to one circuit with the other two sockets attached to a second circuit.

FIG. 5 shows another alternative embodiment. In this embodiment one or more of the female sockets 20 have a cap 30. Typically, there is a cap 30 for each female socket 20. The cap 30 and female socket 20 are configured so that the cap 30 can be placed on or into female socket 20 when the female socket 20 is not in use. The cap 30 provides a safety mechanism for the extension cord 10 to avoid unwanted contact between the active conducting wires 14a–14g of the extension cord 10 and individuals, moisture, or other external objects.

Figure 6:
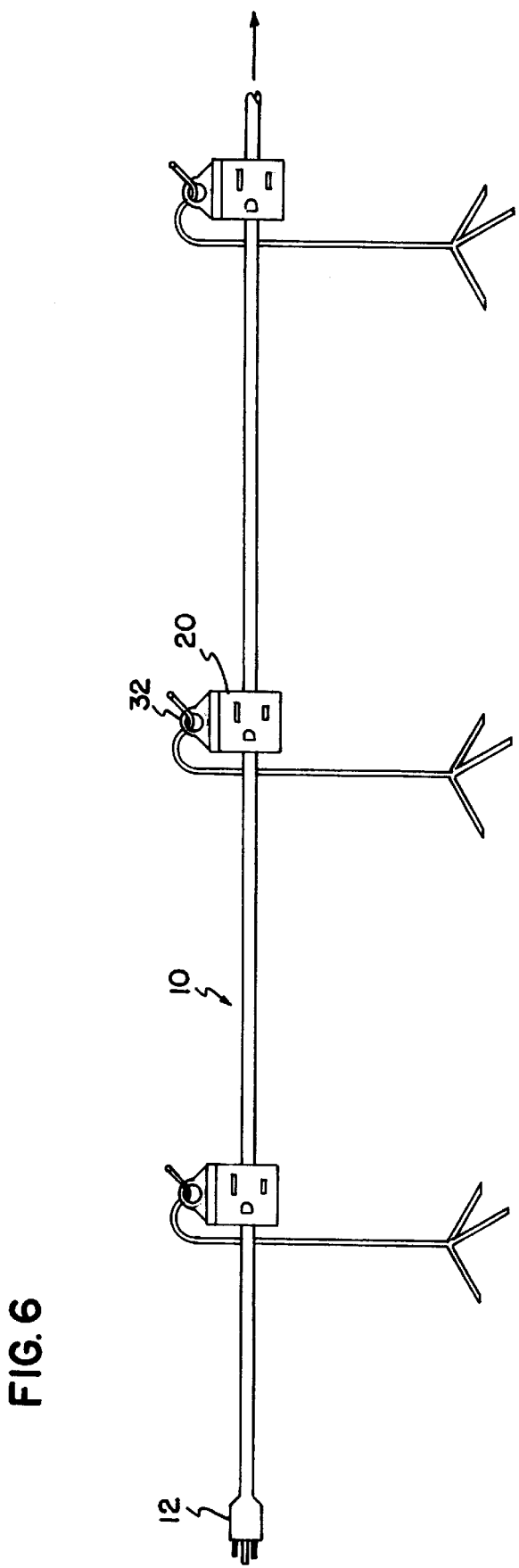
FIG. 6 is a front view of the extension cord of FIG. 5 being held off the ground by use of mooring members attached to the socket blocks of the cord.

Additionally, a mooring member 32 is attached to either the female sockets 20 or the socket blocks 22 which can be used to hold the extension cord 10 in place. For example, the mooring member 32 may be used to fasten the extension cord 10 in a desired place or position or to hold the extension cord 10 off the ground, as depicted in FIG. 6. The mooring member may be a loop or ring of material. Alternatively, the mooring member may be a hook, strap, bracket, slot, or similar device which will permit attachment of the cord to an external object. The mooring member 32 may be used with any extension cord, not only those with multiple circuits. In one embodiment of the invention, the mooring member is integrally molded to the socket or socket block to provide a stable and durable structure.

In an alternative embodiment of the invention, the extension cord is made of a male plug, two or more conducting wires electrically coupled to the male plug, and one or more female sockets coupled to the conducting wires with a mooring member attached to the female sockets or to a socket block which houses the female sockets. In this embodiment of the invention, the female sockets may all be coupled to the same conducting wires, or alternatively, they may be coupled to different conducting wires.

Although the description of the preferred embodiment and method have been quite specific, it is contemplated that various modifications could be made without deviating from the spirit of the present invention. Accordingly, it is intended that the scope of the present invention be dictated by the appended claims, rather than by the description of the preferred embodiment and method.

The claimed invention is:

1. An extension cord comprising:
   a male plug;
   at least three conducting wires electrically coupled to the male plug, each conducting wire having a length;
   a plurality of female sockets disposed at intervals along the lengths of the conducting wires, each female socket being electrically coupled to at least two of the conducting wires, at least one socket having a first service rating and at least one socket having a second service rating the first and second service ratings being different; and wherein each conducting wire is electrically coupled to at least one female socket.

2. The extension cord of claim 1, wherein the cord further comprises a grounding wire coupled to the male plug and one or more of the female sockets.

3. The extension cord of claim 1, wherein the male plug is a twist-lock plug.

4. The extension cord of claim 1, wherein the female sockets are disposed at regular intervals along the lengths of the wires.

5. The extension cord of claim 1, wherein the cord further comprises at least one fuse coupled to at least one of the conducting wires.

6. The extension cord of claim 1, wherein the extension cord further comprises a plurality of circuit identifying marks, wherein each circuit identifying mark is proximate one of the female sockets and configured to indicate which conducting wires are coupled to the proximate female socket.

7. The extension cord of claim 1, wherein the extension cord further comprises a plurality of caps, one cap being attached to each female socket, wherein the cap is configured and arranged to cover the socket when the socket is not in use.

8. The extension cord of claim 1, wherein the extension cord has three conducting wires corresponding to a neutral wire, a first circuit wire, and a second circuit wire.

9. The extension cord of claim 1, wherein the extension cord has four conducting wires corresponding to a neutral wire, a first circuit wire, a second circuit wire, and a third circuit wire.

10. The extension cord of claim 1, wherein the extension cord further comprises an adapter having a female end configured to receive the male plug and a male end configured to plug into an electrical outlet.

11. The extension cord of claim 1 wherein the first service rating is 120 V and the second service rating is 240 V.

12. The extension cord of claim 1 wherein one of the service ratings is 208 V.

13. The extension cord of claim 1, further comprising socket blocks, each female socket being positioned in one of the socket blocks, one or more of the socket blocks further comprises a mooring member coupled to the socket block, the mooring member being configured and arranged to permit attachment of the socket block to an external holding device.

14. The extension cord of claim 13, wherein the mooring member is a loop.

15. The extension cord of claim 1, wherein the extension cord further comprises at least one socket block for housing the female sockets.

16. The extension cord of claim 15, wherein each socket block houses two female sockets.

17. The extension cord of claim 15, wherein the extension cord further comprises a sheathing surrounding and electrically insulating the conducting wires, wherein the sheathing, the plurality of socket blocks, and the male plug are molded together as a single continuous piece.

18. An extension cord comprising:

an electrical cord having a length and a first end;

a male plug coupled to the first end;

three or more conducting wires extending the length of the electrical cord and coupled to the male plug;

at least two socket blocks coupled to the electrical cord at intervals along the cord, each socket block having at least two female sockets, at least one female socket in each socket block having a first service rating and at least one female socket in each socket block having a second service rating, the first and second service ratings being different; and at least two circuit identifying marks attached to each socket block, each circuit identifying mark being proximate one of the female sockets, wherein each circuit identifying mark visually indicates to which conducting wires the proximate female socket is attached.

19. An extension cord comprising:

a male plug;

at least two conducting wires electrically coupled to the male plug, each conducting wire having a length;

a plurality of socket blocks attached to the conducting wires at intervals along the cord, each socket block comprising one or more female sockets coupled to two of the conducting wires and configured to receive male plugs of electrically operated devices; and wherein each socket block further comprises a mooring member coupled to the socket block, the mooring member being configured and arranged to permit attachment of the socket block to an external object.

20. An extension cord comprising:

an electrical cord having a length and a first end;

a male plug coupled to the first end;

a plurality of socket blocks coupled to the electrical cord at intervals along the cord, each socket block including at least one female socket, each female socket being electrically coupled to electrical communication with the electric cord; and a plurality of mooring members at intervals along the electric cord.

21. The extension cord of claim 20 wherein at least one mooring member is coupled to each socket block.

22. The extension cord of claim 20 wherein each mooring member is a loop.

* * * * *